US011175302B2

(12) United States Patent
Asakura et al.

(10) Patent No.: US 11,175,302 B2
(45) Date of Patent: Nov. 16, 2021

(54) APPARATUS AND METHOD FOR AUTOMATED ANALYSIS

(71) Applicant: JEOL Ltd., Tokyo (JP)

(72) Inventors: Makoto Asakura, Tokyo (JP); Yasushi Kondo, Tokyo (JP); Kouichi Saika, Tokyo (JP); Yasuhiro Fukumoto, Tokyo (JP); Takeshi Muranaka, Tokyo (JP); Mine Yamashita, Tokyo (JP); Yoshikazu Tagawa, Tokyo (JP)

(73) Assignee: JEOL Ltd., Tokyo (JP)

( * ) Notice: Subject to any disclaimer, the term of this patent is extended or adjusted under 35 U.S.C. 154(b) by 336 days.

(21) Appl. No.: 16/390,244

(22) Filed: Apr. 22, 2019

(65) Prior Publication Data

US 2019/0331706 A1 Oct. 31, 2019

(30) Foreign Application Priority Data

Apr. 26, 2018 (JP) .............................. JP2018-085380

(51) Int. Cl.
*G01N 35/10* (2006.01)
*G01N 35/00* (2006.01)
*G01N 35/04* (2006.01)

(52) U.S. Cl.
CPC ... *G01N 35/1009* (2013.01); *G01N 35/00722* (2013.01); *G01N 35/04* (2013.01);
(Continued)

(58) Field of Classification Search
CPC ......... G01N 35/1009; G01N 35/00722; G01N 35/04; G01N 35/1065; G01N 2035/009;
(Continued)

(56) References Cited

U.S. PATENT DOCUMENTS 6,151,041 A * 11/2000 Bolash ................. B41J 2/17546
347/14
8,905,089 B2 * 12/2014 Evans ................... G05D 7/0617
141/231
(Continued)

FOREIGN PATENT DOCUMENTS

EP         2040083 A2     3/2009
JP      2012108062 A  *  6/2012
(Continued)

OTHER PUBLICATIONS

Extended European Search Report issued in EP19169662.4 dated Sep. 18, 2019.
(Continued)

*Primary Examiner* — Jill A Warden
*Assistant Examiner* — John McGuirk
(74) *Attorney, Agent, or Firm* — The Webb Law Firm (57) ABSTRACT

There is provided an automated analyzer which has plural liquid tanks connected with a dispensing probe and which can efficiently switch the operative liquid tank according to measurement item. The automated analyzer includes a liquid dispenser having a dispensing probe and a pump capable of aspirating and dispensing a liquid from and into an open end of the probe, the liquid dispenser being operative to cause the liquid aspirated in the probe and a probe internal liquid to be dispensed into aliquot receptacles. The automated analyzer also includes; an internal liquid supply device having plural liquid tanks in which probe internal liquids corresponding to measurement items are stored, the supply device being operative to supply a probe internal liquid into the dispensing probe from one of the tanks. The automated analyzer further includes an input section and an operation controller.

13 Claims, 8 Drawing Sheets

(52) U.S. Cl.
CPC ... *G01N 35/1065* (2013.01); *G01N 2035/009* (2013.01); *G01N 2035/0406* (2013.01); *G01N 2035/0443* (2013.01); *G01N 2035/0453* (2013.01); *G01N 2035/0475* (2013.01); *G01N 2035/1032* (2013.01)

(58) Field of Classification Search
CPC ... G01N 2035/0406; G01N 2035/0443; G01N 2035/0453; G01N 2035/0475; G01N 2035/1032; G01N 35/1097; G01N 2035/0091; G01N 35/1004; G01N 35/1002; G01N 35/02
See application file for complete search history.

(56) References Cited

U.S. PATENT DOCUMENTS

2009/0074616 A1    3/2009    Sento et al.
2015/0276769 A1*  10/2015   Yamaguchi ............ G01N 33/86 436/63
2016/0193622 A1*  7/2016    Miyakawa .............. B05B 12/12 134/18

FOREIGN PATENT DOCUMENTS

| JP | 2012108062 A |   | 6/2012 |
| JP | 20142099 A   |   | 1/2014 |
| JP | 2014002099 A | * | 1/2014 |

OTHER PUBLICATIONS

Office Action issued in Japanese Application No. 2018-085380 dated Sep. 29, 2020.

* cited by examiner

| MEASUREMENT ITEM | PROBE INTERNAL LIQUID |
|---|---|
| HbA1c | PURE WATER |
| xxxxxxxxx | PHYSIOLOGICAL SALT SOLUTION |
| xxxxxxxxx | PURE WATER |
| xxxxxxxxx | PHYSIOLOGICAL SALT SOLUTION |
| xxxxxxxxx | NO RESTRICTION |
| xxxxxxxxx | NO RESTRICTION |
| xxxxxxxxx | PURE WATER / PHYSIOLOGICAL SALT SOLUTION |

APPARATUS AND METHOD FOR AUTOMATED ANALYSIS

CROSS-REFERENCE TO RELATED APPLICATION

This application claims priority to Japanese Patent Application No. 2018-085380 filed Apr. 26, 2018, the disclosure of which is hereby incorporated by reference in its entirety.

BACKGROUND OF THE INVENTION

Field of the Invention

The present invention relates to an apparatus and method for automated analysis.

Description of Related Art

Biochemical analyzers for analyzing biochemical components contained in an analyte such as blood or urine are known as one type of automated analyzer. Such an automated analyzer is disclosed (see JP-A-2012-108062) and configured, when a given amount of a sample is aspirated by a sample dispensing probe and then dispensed into a reaction cell, to perform the function of dispensing a liquid, which performs a hemolytic action in the sample dispensing probe, into the reaction cell together with the sample.

The automated analyzer described so far can perform measurements about different items of measurement by replacing the liquid (such as a liquid having hemolytic action) present inside the sample dispensing probe by other liquids such as physiological salt solution. However, in order to replace the internal liquid of the sample dispensing probe, it is necessary to switch the liquid tank connected with the sample dispensing probe to a different liquid tank, thus taking labor.

SUMMARY OF THE INVENTION

Accordingly, it is an object of the present invention to provide an apparatus and method for automated analysis in which plural liquid tanks are connected with a dispensing probe such that only one of the tanks (hereinafter may also be referred to as the operative tank) in fluid communication with the dispensing probe and functioning can be effectively switched according to measurement item.

This object is achieved in accordance with the teachings of the present invention by an automated analyzer comprising:

a liquid dispenser having a dispensing probe and a pump capable of aspirating and dispensing a liquid from and into an open end of the dispensing probe that is at one end thereof, the liquid dispenser being operative to cause the liquid aspirated in the dispensing probe from the open end and a probe internal liquid of the dispensing probe to be dispensed into aliquot receptacles;

an internal liquid supply device having a plurality of liquid tanks in which probe internal liquids corresponding to measurement items are stored, supply tubes for placing the liquid tanks in communication with the other end of the dispensing probe, and a selector valve mounted in front of the supply tubes and operative to selectively placing the plurality of liquid tanks into communication with the dispensing probe, the internal liquid supply device being operative to supply a probe internal liquid into the dispensing probe from one of the liquid tanks;

an input section for entering settings regarding operation of the dispenser; and an operation controller for controlling operation of the dispenser based on inputs from the input section.

The automated analyzer performs measurements regarding different measurement items by switching the liquid tank in communication with the dispensing probe via the selector valve, which is an automatic valve, under control of the operation controller.

The present invention can provide an apparatus and method for automated analysis capable of efficiently switching, according to measurement item, the liquid tank in fluid communication with the dispensing probe between the plurality of liquid tanks connected with the dispensing probe.

DESCRIPTION OF THE INVENTION

Embodiments of the apparatus and method for automated analysis of the present invention are hereinafter described in detail with reference to the drawings.

<<Automated Analyzer>>

Figure 1:
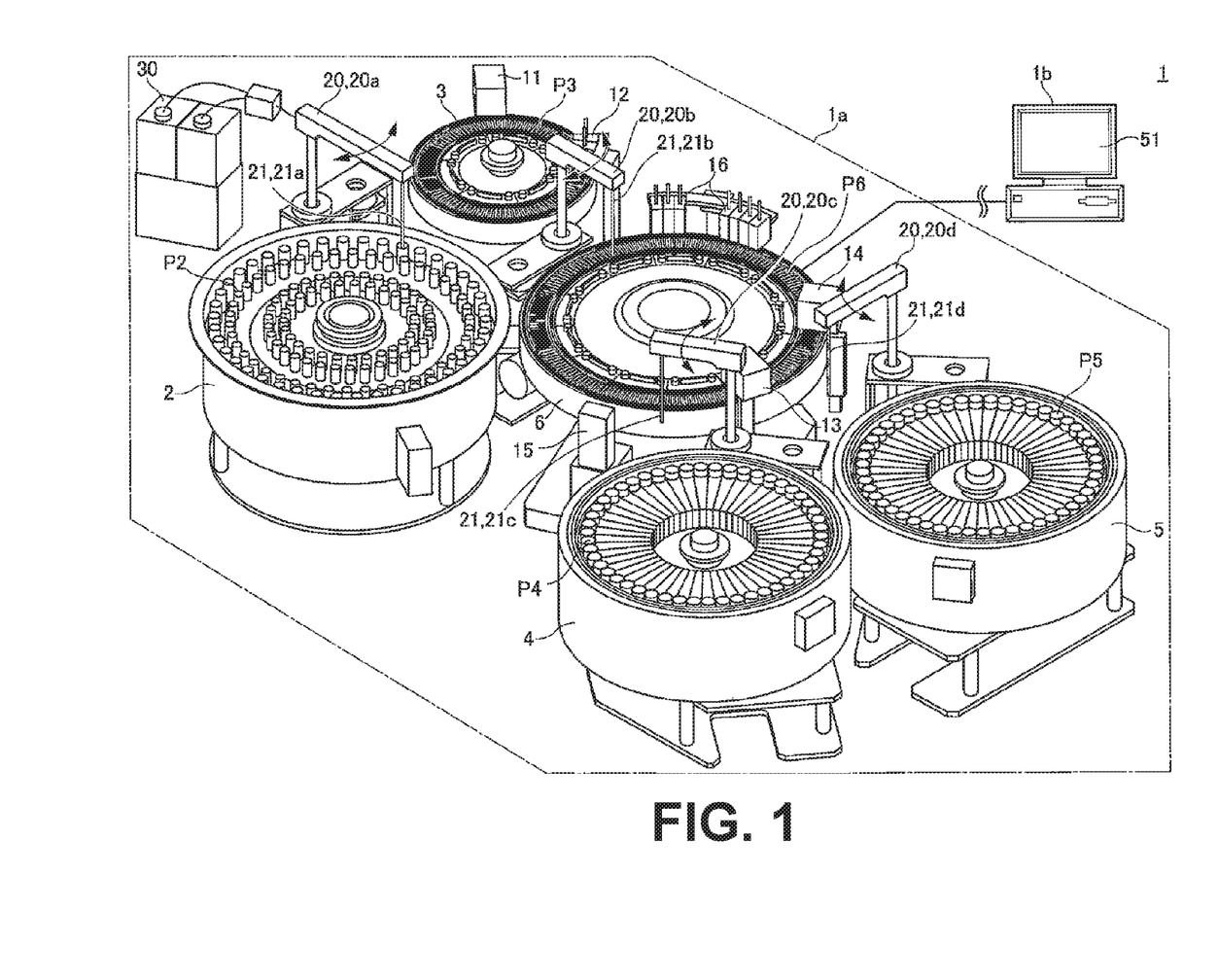
FIG. 1 is a schematic perspective view of an automated analyzer associated with one embodiment of the present invention.

FIG. 1 schematically shows the configuration of an automated analyzer associated with one embodiment of the present invention. This automated analyzer, 1, according to the present invention is a biochemical analyzer for analyzing biological components contained in each analyte such as blood or urine. As shown in FIG. 1, the automated analyzer 1 has a measuring section 1a and a control section 1b.

The measuring section 1a includes, for example, an analyte holding portion 2, a diluted analyte holding portion 3, a first reagent holding portion 4, a second reagent holding portion 5, and a reaction receptacle holding portion 6. Furthermore, the measuring section 1a includes a diluent stirrer 11, a dilution cleaning device 12, a first reaction stirrer 13, a second reaction stirrer 14, a multi-wavelength photometer 15, and reaction receptacle cleaning devices 16.

In addition, the measuring section 1a has a plurality of dispensers 20 and an internal liquid supply device 30. In this example, the dispensers 20 are four in number, i.e., an analyte dispenser 20a, a diluted analyte dispenser 20b, a first reagent dispenser 20c, and a second reagent dispenser 20d. Each dispenser 20 has a dispensing probe 21.

Figure 2:
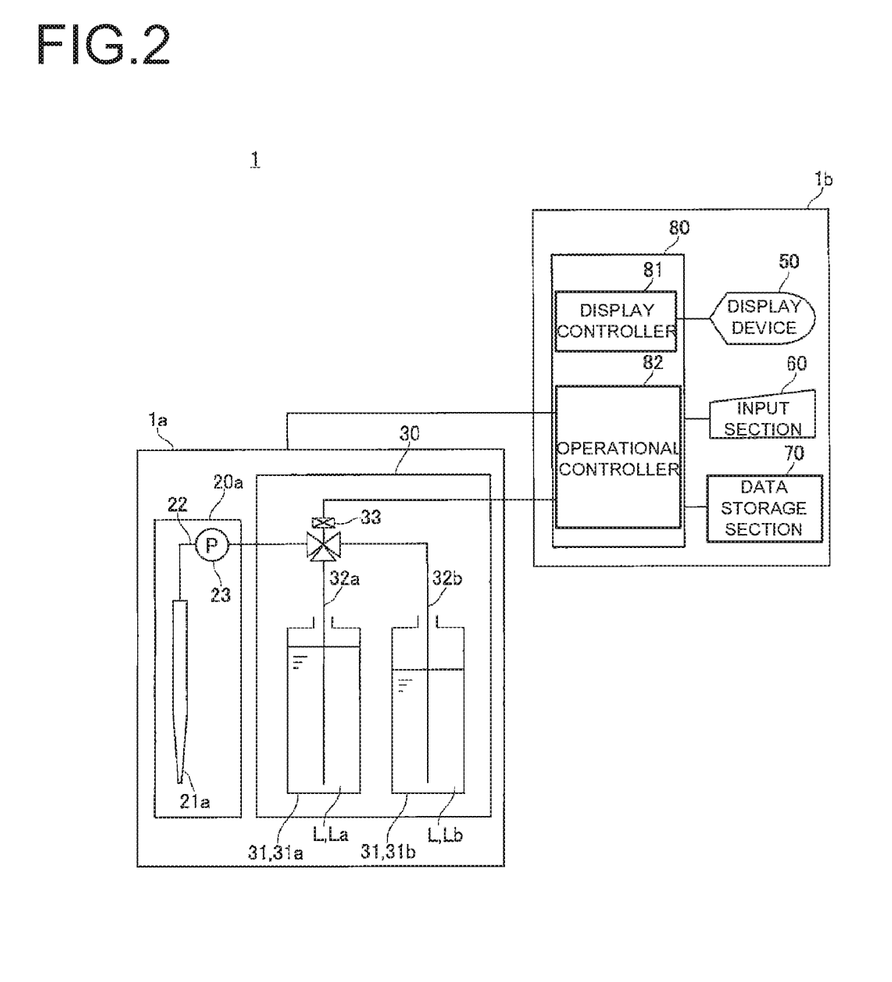
FIG. 2 is a block diagram of the automated analyzer of FIG. 1.

FIG. 2 is a block diagram of the automated analyzer shown in FIG. 1. As shown, the control section 1b includes a display device 50. Furthermore, the control section 1*b* has an input section 60, a data storage section 70, and an input/output controller 80 which will be described in further detail in relation to FIGS. 1 and 2. First, the measuring section 1*a* and the control section 1*b* are described in turn.

<Measuring Section 1*a*>

Analyte Holding Portion 2

The analyte holding portion 2 is one of storage receptacle holding portions for holding a plurality of storage receptacles in which liquid aliquots are stored. This analyte holding portion 2 is shaped, for example, in the form of a turntable. Plural rows of analyte receptacles P2 (i.e., storage receptacles) are held along the fringes of the analyte holding portion 2. The held analyte receptacles P2 are transported in both directions circumferentially. The analyte holding portion 2 is supported so as to be rotatable circumferentially by a drive mechanism (not shown). Analytes under measurement and control analytes used for accuracy management are stored as liquid aliquots in the analyte receptacles P2 which in turn are held on the analyte holding portion 2. These various analytes are held in position on the analyte holding portion 2.

Diluent receptacles storing a diluent and cleaning solution receptacles storing a cleaning solution may be held as storage receptacles on the analyte holding portion 2, as well as the analyte receptacles P2. The analyte holding portion 2 described so far may have a function of cooling the held analyte receptacles P2 and other receptacles.

Diluted Analyte Holding Portion 3

The diluted analyte holding portion 3 is one of aliquot receptacle holding portions for holding aliquot receptacles that are target receptacles for dispensed liquid aliquots, and is also one of the storage receptacle holding portions for holding a plurality of storage receptacles in which liquid aliquots are stored. This diluted analyte holding portion is in the form, for example, of a turntable and holds a plurality of dilution receptacles P3 (i.e., serving as aliquot receptacles and also as storage receptacles) along its fringes. The diluted analyte holding portion conveys the held dilution receptacles P3 in both directions circumferentially. The diluted analyte holding portion 3 is supported by a drive mechanism (not shown) so as to be rotatable circumferentially.

Analytes aspirated from the analyte receptacles P2 arranged on the analyte holding portion 2 are diluted and dispensed as liquid aliquots into the dilution receptacles P3 that are held on the diluted analyte holding portion 3. The diluted analytes are stored as liquid aliquots in the analyte receptacles P2. The automated analyzer 1 may not be provided with the diluted analyte holding portion 3.

First Reagent Holding Portion 4 and Second Reagent Holding Portion 5

Each of the first reagent holding portion 4 and the second reagent holding portion 5 is one of the storage receptacle holding portions for holding a plurality of storage receptacles in which liquid aliquots are stored. The first reagent holding portion 4 is in the form, for example, of a turntable and holds along its fringes a plurality of first reagent receptacles P4 (i.e., storage receptacles). Similarly, the second reagent holding portion 5 is in the form, for instance, of a turntable and holds along its fringes a plurality of second reagent receptacles P5 (i.e., storage receptacles). The first reagent holding portion 4 and the second reagent holding portion 5 convey the held first reagent receptacles P4 and second reagent receptacles P5, respectively, in both directions circumferentially. These first and second reagent holding portions 4 and 5 are supported by their respective drive mechanisms (not shown) so as to be rotatable circumferentially.

Reaction Receptacle Holding Portion 6

The reaction receptacle holding portion 6 is one of the aliquot receptacle holding portions for holding aliquot receptacles that will be aliquot targets for liquid aliquots. This reaction receptacle holding portion 6 is arranged among the diluted analyte holding portion 3, the first reagent holding portion 4, and the second reagent holding portion 5. This reaction receptacle holding portion 6 is, for example, in the form of a turntable, holds along its fringes a plurality of reaction receptacles P6 (i.e., aliquot receptacles), and conveys the held reaction receptacles P6 in both directions circumferentially. The reaction receptacle holding portion 6 is supported by a drive mechanism (not shown) so as to be rotatable circumferentially.

A given amount of the diluted analyte collected from a selected one of the dilution receptacles P3 on the diluted analyte holding portion 3, a given amount of the first reagent collected from a selected one of the first reagent receptacles P4 on the first reagent holding portion 4, and a given amount of the second reagent collected from a selected one of the second reagent receptacles P5 on the second reagent holding portion 5 are dispensed as aliquots into each reaction receptacle P6 held on the reaction receptacle holding portion 6. In the reaction receptacle P6, the diluted analyte, first reagent, and second reagent are stirred and reacted together. Alternatively, the diluted analyte and the first reagent may be stirred and reacted together.

The reaction receptacle holding portion 6 as described so far is configured to maintain the temperature of the reaction receptacles P6 constant at all times by a thermostat bath (not shown). Where the automated analyzer 1 is not provided with the diluted analyte holding portion 3, analytes collected from the analyte receptacles P2 on the analyte holding portion 2 are dispensed as aliquots into the reaction receptacles P6 held on the reaction receptacle holding portion 6.

Diluent Stirrer 11

The diluent stirrer 11 is disposed near the outer periphery of the diluted analyte holding portion 3. The diluent stirrer 11 has a stirring mechanism and a drive mechanism for driving the stirring mechanism. The diluent stirrer 11 inserts a stirring element (not shown) into a selected one of the dilution receptacles P3 held on the dilution holding portion 3 and stirs together an analyte and a diluent.

Dilution Cleaning Device 12

The dilution cleaning device 12 is disposed near the outer periphery of the diluted analyte holding portion 3. The dilution cleaning device 12 is a device for cleaning the dilution receptacles P3 from which the diluted analyte has been aspirated by the diluted analyte dispenser 20*b*, to be described hereinafter.

First Reaction Stirrer 13 and Second Reaction Stirrer 14

The first reaction stirrer 13 and the second reaction stirrer 14 are arranged around the reaction receptacle holding portion 6 and stir together the diluted analyte and the first reagent or the second reagent, respectively, in the reaction receptacles P6 held on the reaction receptacle holding portion 6. Each of the first reaction stirrer 13 and the second reaction stirrer 14 has a stirring mechanism and a drive mechanism for driving the stirring mechanism, inserts a stirring element (not shown) into the reaction receptacle P6 held in position on the reaction receptacle holding portion 6, and stirs together the diluted analyte (or analyte) and the first reagent or second reagent. Consequently, the reaction of the diluted analyte with the first reagent or the second reagent is promoted.

Multi-Wavelength Photometer 15

The multi-wavelength photometer 15 is a measuring section and disposed opposite to the outer peripheral wall of the reaction receptacle holding portion 6. The multi-wavelength photometer 15 performs optical measurements on diluted analytes which have reacted with the first or second reagent in the reaction receptacles P6, outputs signals indicative of the amounts of various components in the analytes as absorbances, and detects the state of reaction of the diluted analytes.

Reaction Receptacle Cleaning Devices 16

The reaction receptacle cleaning devices 16 are arranged around the reaction receptacle holding portion 6. The cleaning devices 16 are devices for cleaning the insides of the reaction receptacles P6 for which testing has been completed.

Analyte Dispenser 20a

The analyte disperser 20a is one of the dispensers 20 and has an analyte probe 21a that is a dispensing probe 21 in the form of a thin tube. The analyte disperser 20a is disposed close both to the outer peripheries of the analyte holding portion 2 and of the diluted analyte holding portion 3. The analyte probe 21a has an open end at one end thereof, and dispenses and aspirates liquid into and from the open end. The analyte probe 21a has the other end in communication with the liquid supply tube 22. A pump 23 for aspirating and delivering liquid from the open end (one end) of the analyte probe 21a is mounted in the liquid supply tube 22.

The analyte dispenser 20a inserts the open end of the analyte probe 21a whose axial direction is kept vertical into the analyte in a selected one of the analyte receptacles P2 held on the analyte holding portion 2 by a drive mechanism (not shown) and draws a given amount of analyte into the analyte probe 21a in accordance with a preset measurement program. At this time, the analyte holding portion 2 transports the analyte receptacles P2 held in position on the analyte holding portion 2 into a given analyte collection position in accordance with the preset measurement program.

Furthermore, the analyte dispenser 20a inserts the open end of the analyte probe 21a into a selected one of the dilution receptacles P3 on the dilution analyte holding portion 3 and dispenses the analyte aspirated in the analyte probe 21a and the probe internal liquid supplied from the liquid supply tube 22 into the dilution receptacle P3. The probe internal liquid is the liquid supplied from the internal liquid supply device 30, to be described hereinafter, and is physiological salt solution, pure water, or other liquid. These liquids are used as a diluent, pretreatment liquid having hemolytic action, or a detergent, as appropriate according to measurement item or details of processing. Furthermore, the analyte dispenser 20a carries out cleaning of the internal wall of the analyte probe 21a.

Where the automated analyzer 1 is not provided with the diluted analyte holding portion 3, the analyte dispenser 20a inserts the open end of the analyte probe 21a into the reaction receptacle P6 on the reaction receptacle holding portion 6. Then, the analyte dispenser 20a dispenses the analyte drawn in the analyte probe 21a and the probe internal liquid into the reaction receptacle P6.

Diluted Analyte Dispenser 20b

The diluted analyte dispenser 20b is one of the dispensers 20 and equipped with a diluted analyte probe 21b that is a dispensing probe 21 in the form of a thin tube. The diluted analyte dispenser 20b is disposed between the diluted analyte holding portion 3 and the reaction receptacle holding portion 6. The diluted analyte dispenser 20b causes a drive mechanism (not shown) to insert the open end of the diluted analyte probe 21b having its axial direction kept vertical into a selected one of the dilution receptacles P3 on the diluted analyte holding portion 3 and to draw in a given amount of diluted analyte from the open end of the diluted analyte probe 21b filled with a system water in accordance with a preset measurement program. Furthermore, the diluted analyte dispenser 20b inserts the open end of the diluted analyte probe 21b into a selected one of the reaction receptacles P6 on the reaction receptacle holding portion 6 and dispenses the aspirated diluted analyte drawn in the diluted analyte probe 21b into the reaction receptacle P6. Additionally, the diluted analyte dispenser 20b carries out cleaning of the inner wall of the diluted analyte probe 21b. Where the automated analyzer 1 is not equipped with the diluted analyte holding portion 3, the analyzer 1 does not need to have the diluted analyte dispenser 20b.

First Reagent Dispenser 20c

The first reagent dispenser 20c is one of the dispensers 20 and equipped with a first reagent probe 21c that is a dispensing probe 21 in the form of a thin tube. The first reagent dispenser 20c is disposed between the reaction receptacle holding portion 6 and the first reagent holding portion 4. The first reagent dispenser 21c causes a drive mechanism (not shown) to insert the open end of the first reagent probe 21c having its axial direction kept vertical into a selected one of the first reagent receptacles P4 on the first reagent holding portion 4 such that a given amount of the first reagent is aspirated from the open end of the first reagent probe 21c filled with the system water in accordance with a preset measurement program. Furthermore, the first reagent dispenser 20c inserts the open end of the first reagent probe 21c into a selected one of the reaction receptacles P6 on the reaction receptacle holding portion 6 and dispenses the first reagent drawn in the first reagent probe 21c into the reaction receptacle P6. Additionally, the first reagent dispenser 20c carries out cleaning of the inner wall of the first reagent probe 21c.

Second Reagent Dispenser 20d

The second reagent dispenser 20d is one of the dispensers 20 and equipped with the second reagent probe 21d being a dispensing probe 21 in the form of a thin tube, and is disposed between the reaction receptacle holding portion 6 and the second reagent holding portion 5. The second reagent dispenser 20d causes a drive mechanism (not shown) to insert the open end of the second reagent probe 21d having its axial direction kept vertical into a selected one of the second reagent receptacles P5 on the second reagent holding portion 5 such that a given amount of the second reagent is aspirated from the open end of the second reagent probe 21d filled with the system water in accordance with a preset measurement program. Furthermore, the second reagent dispenser 20d inserts the open end of the second reagent probe 21d into a selected one of the reaction receptacles P6 on the reaction receptacle holding portion 6 and dispenses the second reagent drawn in the second reagent probe 21d into the reaction receptacle P6. Additionally, the second reagent dispenser 20d carries out cleaning of the inner wall of the second reagent probe 21d.

Internal Liquid Supply Device 30

The internal liquid supply device 30 is intended to supply the probe internal liquid into the analyte probe 21a. The internal liquid supply device 30 has a first tank 31a and a second tank 31b (which may be collectively referred to as liquid tanks 31) in which the probe internal liquid L is stored. It is assumed that different probe internal liquids La and Lb corresponding to measurement items are stored in the first tank 31a and the second tank 31b, respectively. Furthermore, the internal liquid supply device 30 has supply tubes 32a and 32b which are inserted in the first tank 31a and the second tank 31b, respectively. The supply tubes 32a and 32b are connected with the liquid supply tube 22 of the analyte probe 21a to place the liquid tanks 31 into communication with the other end of the analyte probe 21a.

A selector valve 33 is mounted in front of the supply tubes 32a and 32b to selectively place these supply tubes 32a and 32b into fluid communication with the liquid supply tube 22. In particular, the selector valve 33 places one of the two supply tubes 32a and 32b into communication with the liquid supply tube 22 and blocks communication from the other to the liquid supply tube 22. Consequently, the analyte probe 21a in communication with the liquid supply tube 22 is connectable with the first tank 31a or the second tank 31b in which a respective one of the two supply tubes 32a and 32b is inserted. The internal states of the liquid tanks 31 are switched by the selector valve 33 in this way. As a result, the probe internal liquids La and Lb stored in the first tank 31a and the second tank 31b, respectively, can selectively work as the probe internal liquid present both in the liquid supply tube 22 and in the analyte probe 21a. As an example, a three-way valve is used as the selector valve 33.

Furthermore, this selector valve 33 can be a motor-operated valve (such as an electromagnetic valve) that can selectively establish and break the aforementioned fluid communication under instructions from the control section 1b, to be described next.

The selector valve 33 is not restricted to a three-way valve as long as the valve can switch the supply tube 32a or 32b in flow communication with the liquid supply tube 22. For example, the selector valve 33 may use plural two-way valves respectively mounted between the liquid supply tube 22 and one supply tube 32a and between the liquid supply tube 22 and the other supply tube 32b by combining the selector valve 33 with a pump added according to the need.

<Control Section 1b>

The control section 1b is connected with drive mechanisms for various components of the above-described measuring section 1a and with the multi-wavelength photometer 15. This control section 1b has the display device 50, the input section 60, the data storage section 70, and the input/output controller 80, to be described in detail as follows.

Display Device 50

The display device 50 displays the results of measurements performed by the multi-wavelength photometer 15. In addition, the display device 50 displays a control screen permitting an operator to control and manipulate the automated analyzer 1, various setting information about measurements, and various operational history information. It is also assumed that the display device 50 acts also as an alarm output portion which produces an alarm output when an abnormality occurs with a measurement operation performed by the automated analyzer 1 or when a measurement item asked to be measured cannot be measured under the current state of operation of the automated analyzer. The warning output portion is not restricted to the display device 50. The warning output portion may be a loudspeaker (not shown) or a combination of the display device 50 and a loudspeaker.

One example of screen displayed on the display device 50 is next described with reference to FIGS. 1 and 2 and some of FIGS. 3-6

Figure 3:
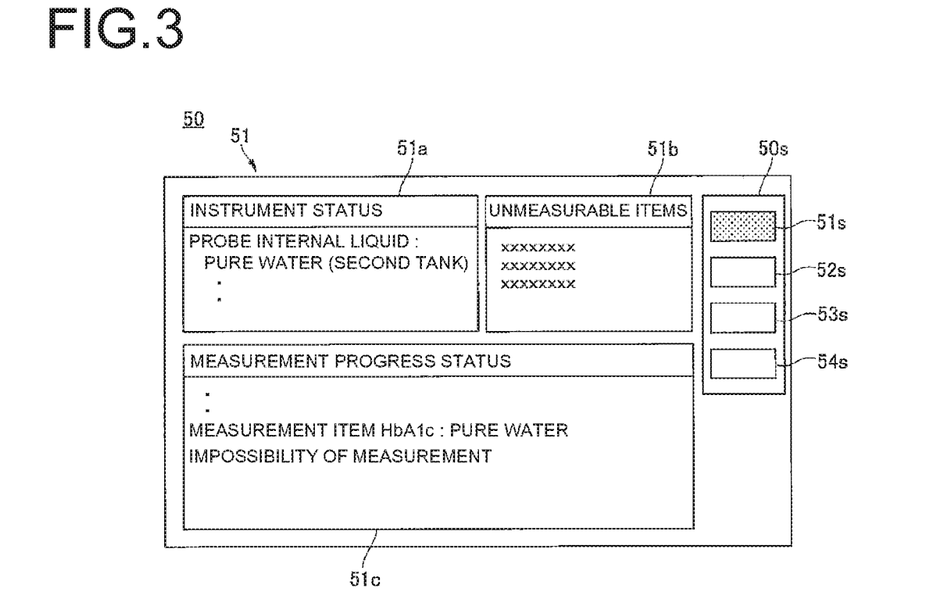
FIG. 3 is a screen diagram illustrating one example of confirmation screen displayed on the display device.

FIG. 3 is a screen diagram illustrating one example of confirmation screen 51 displayed on the display device 50. As shown in FIG. 3, the confirmation screen 51 for confirmation of the present status of the automated analyzer 1 is presented on the display device 50. The confirmation screen 51 contains instrument status 51a, unmeasurable items 51b, measurement progress status 51c, and other data.

Among these data, the probe internal liquid of the analyte probe 21a and reagents stored in the storage receptacles on the first reagent holding portion 4 and second reagent holding portion 5, for example, are displayed as the instrument status 51a. The probe internal liquid of the analyte probe 21a is information associated with the information about the liquid tank 31 with which the analyte probe 21a is currently connected, and indicates how the two liquid tanks 31 are in communication with the analyte probe 21a.

Measurement items that cannot be measured under the current instrument status are displayed as the unmeasurable items 51b. For example, measurement items that cannot be measured using the current probe internal liquid of the analyte probe 21a are displayed. Instead of the unmeasurable items 51b, measurable items may be displayed.

The status of measurement progress of a requested measurement item is displayed as the measurement progress status 51c. When the requested measurement item cannot be measured, warnings are sequentially displayed along the progress of a normal measurement operation.

Figure 4:
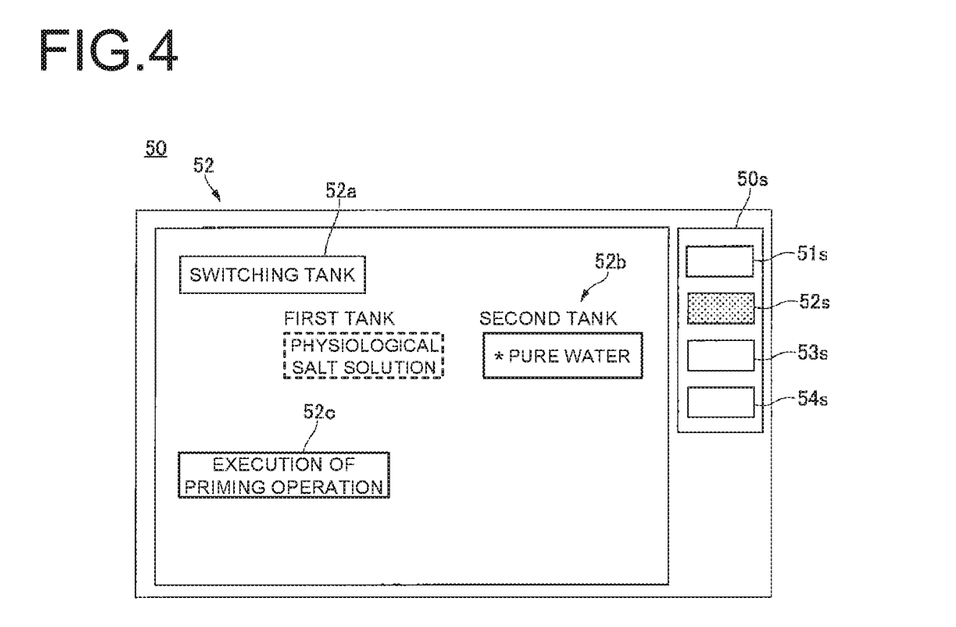
FIG. 4 is a screen diagram illustrating one example of control screen displayed on the display device.

FIG. 4 illustrates one example of a control screen 52 displayed on the display device 50. As shown in this figure, the control screen 52 for the automated analyzer 1 is displayed. This control screen 52 includes, for example, a tank switching button or icon 52a for switching the liquid tank 31 containing the probe internal liquid and connected with the analyte probe 21a, a tank display button or icon 52b, and a priming execution control button or icon 52c.

If this display device 50 is provided with a touch panel, an input is provided for switching the liquid tank 31 connected with the analyte probe 21a by touching the tank switching button 52a. Information indicating whether the liquid tank 31 currently connected with the analyte probe 21a is the first tank 31a or the second tank 31b is displayed on the tank display button 52b. The probe internal liquid L stored in the liquid tank 31 may also be displayed. By touching the priming execution control button 52c, an input is provided for execution of a priming operation consisting of replacing the probe internal liquid present both in the liquid supply tube 22 and in the analyte probe 21a. This input action may be performed by manipulating a cursor (not shown) by means of the input section 60.

Figure 5:
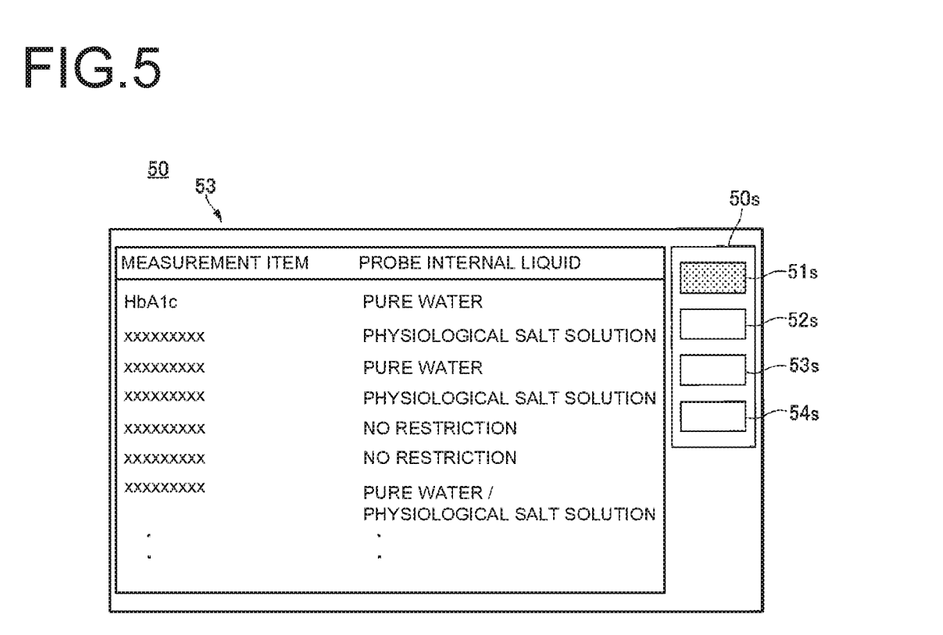
FIG. 5 is a screen diagram illustrating one example of setting screen for measurement items displayed on the display device.

FIG. 5 illustrates one example of the measurement item setting screen 53 displayed on the display device 50. As shown in this figure, the setting screen 53 for a measurement item or items is displayed on the display device 50. The measurement item setting screen 53 includes, for example, information about the measurement item(s) measured by the automated analyzer 1 and information about the probe internal liquid of the analyte probe 21a for carrying out the measurement of the measurement item. It is assumed that such setting is represented by information which is entered, for example, from the input section 60 and stored in the data storage section 70.

Figure 6:
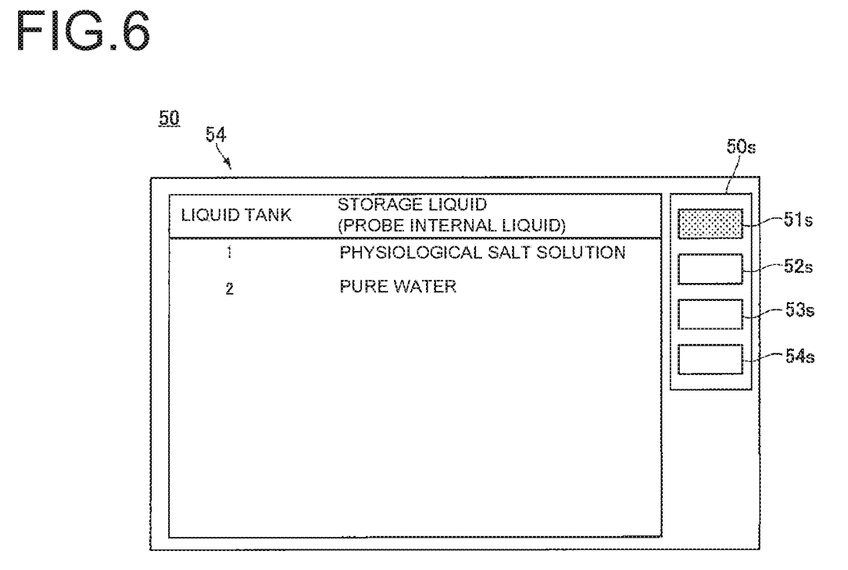
FIG. 6 is a screen diagram illustrating one example of liquid tank setting screen displayed on the display device.

FIG. 6 illustrates one example of the liquid tank setting screen 54 displayed on the display device 50. As shown in this figure, the liquid tank setting screen 54 is displayed on the display device 50. This setting screen 54 includes, for example, a display of the probe internal liquids L stored in the first tank 31a and second tank 31b, respectively, mounted in the automated analyzer 1. In the illustrated example, the settings are such that physiological salt solution is stored in the first tank 31a and that pure water is stored in the second tank 31b. It is assumed that such settings are represented, for example, by information which is entered from the input section 60 and stored in the data storage section 70.

Furthermore, as shown in FIGS. 3-6, a choice screen 50s is kept displayed at all times on the display device 50. The choice screen 50s includes a plurality of choice buttons or icons 51s-54s. When these choice buttons 51s-54s are touched, the confirmation screen 51, a control screen 52, a measurement item setting screen 53, and a liquid tank setting screen 54 are respectively selected and displayed. Other screens can be displayed on the display device 50.

Input Section 60

The input section 60 accepts inputs regarding various settings made by the operator of the automated analyzer 1, inputs regarding settings of operation of various drive mechanisms, and other inputs, and provides input signals to the input/output controller 80. For example, a mouse, a keyboard, a touch panel mounted on the display face of the display device 50, or the like is used as the input section 60. Where this automated analyzer 1 is connected with a personal computer or other external device, such external device may act as the input section 60.

Data Storage Section 70

The data storage section 70 is made, for example, of a mass storage device such as a HDD (hard disk drive) or a semiconductor memory. Various programs executed by the input/output controller 80, to be described next, the current status of the aforementioned automated analyzer 1, various setting information, and various operational history information are stored in the data storage section 70.

Among these kinds of information, the setting information is, for example, related to measurement items, and is information concerning the probe internal liquid of the analyte probe 21a for carrying out measurements of measurement items. The setting information is established on the measurement item setting screen 53 shown in FIG. 5. Another type of setting information is related to the liquid tank 31 placed, for example, in communication with the analyte probe 21a. A further type of setting information is related to the probe internal liquids L stored in the first tank 31a and in the second tank 32b and established on the liquid tank setting screen 54 shown in FIG. 6. These types of setting information are stored in the data storage section 70 in response to inputs from the input section 60.

The operational history information is related to measurement history and warning history and displayed, for example, in the measurement progress status 51c shown in FIG. 3. These kinds of history information are stored in the data storage section 70 based on signals from the input/output controller 80.

Input/output Controller 80

The input/output controller 80 is made of a computing device such as a microcomputer. The computing device has a CPU (central processing unit) and storage sections such as a ROM (read only memory) and a RAM (random access memory) and controls the operation of the various parts of the automated analyzer 1. This input/output controller 80 has a display controller 81 and an operational controller 82. The storage sections such as a ROM and a RAM may be the data storage section 70.

Display Controller 81

The display controller 81 generates displayed screens based on an input signal from the input section 60, on information stored in the data storage section 70, and on signals from the operation controller 82 and from the measuring section 1a, and displays the generated screens on the display device 50. The manner in which the display device 50 is controlled by the display controller 81 is described in detail in relation to the method of automated analysis described next.

Operation Controller 82

The operation controller 82 controls the operational timings of the drive mechanisms of the measuring section 1a and the timing at which light intensity is measured at the multi-wavelength photometer 15. At this time, the operation controller 82 controls the drive mechanisms of the analyte dispenser 20a and of the internal liquid supply device 30 such that an analyte is aspirated from a given analyte receptacle P2 held on the analyte holding portion 2 and a given probe internal liquid is dispensed together with the analyte into a selected one of the dilution receptacles P3 held on the diluted analyte holding portion 3 by the analyte probe 21a.

Furthermore, the operation controller 82 controls the drive mechanisms such that the diluted analyte in the dilution receptacle P3, the first reagent in the first reagent receptacle P4, and the second reagent in the second reagent receptacle P5 are mixed and reacted together in the reaction receptacle P6 and that the absorbance of the resulting reaction liquid is measured by the multi-wavelength photometer 15. The manner in which measurements are controlled by the operation controller 82 is described in detail next in relation to the method of automated analysis.

The operation controller 82 switches the operative liquid tank 31 in connection with the liquid supply tube 22 based on an input signal from the input section 60. This switching operation performed by the operation controller 82 is described in detail next with reference to the method of automated analysis.

<<First Example of Method of Automated Analysis>>

Figure 7:
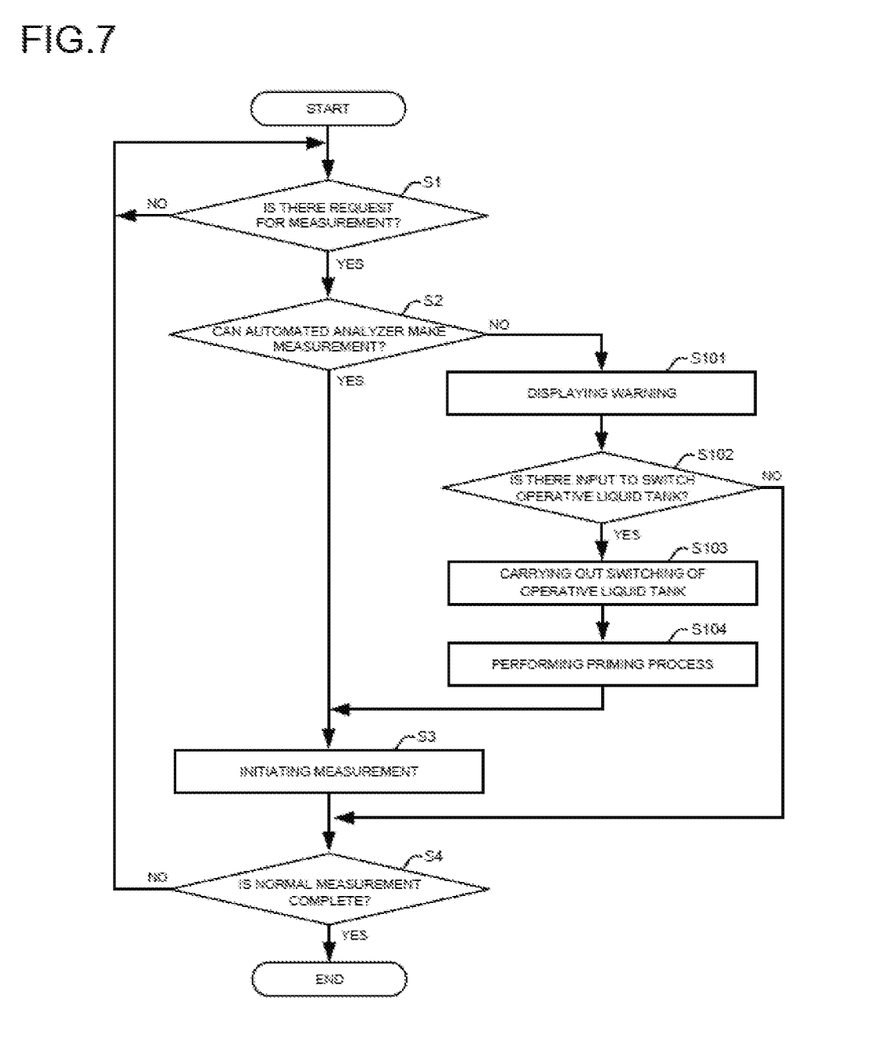
FIG. 7 is a flowchart illustrating a first example of the method of automated analysis using the automated analyzer of FIG. 1.

FIG. 7 is a flowchart illustrating a first example of the method of automated analysis using the automated analyzer 1 of the above-described embodiment. The illustrated method of automated analysis consists of a series of procedures of preprocessing for causing the automated analyzer 1 to initiate measurement processing regarding a requested measurement item when a normal measurement operation is effected.

This series of procedures is accomplished by executing programs stored in the data storage section by the use of the CPU constituting the input/output controller 80 already described in connection with FIG. 2. The first example of the method of automated analysis performed by the input/output controller 80 of the automated analyzer 1 is described below by referring to the flowchart of FIG. 7 and also to FIGS. 1 and 2 and further to FIGS. 3-6 as necessary.

<Step S1>

First, at step S1, the operation controller 82 makes a decision as to whether there is a request for measurement from the input section 60. This decision is repeatedly carried out until a Yes decision (i.e., there is a request for measurement) occurs, in which case control goes to step S2.

<Step S2>

In step S2, the operation controller 82 makes a decision as to whether the automated analyzer 1 can make a measurement regarding the requested measurement item, based on the setting information (see FIG. 5) about the measurement item stored in the data storage section 70 and on the current status of the automated analyzer 1 (see FIG. 3). For example, where the requested measurement item is hemoglobin A1c (HbA1c), if the probe internal liquid L of the liquid tank L31 currently in communication with the analyte probe 21a is pure water, the decision is YES, i.e., the measurement is feasible. Control proceeds to step S3. On the other hand, if the probe internal liquid L of the liquid tank L31 currently in communication with the analyte probe 21a is not pure water, the decision is NO, i.e., the measurement is infeasible, and control goes to step S101.

If there is a request for measurement regarding plural measurement items, this decision is carried out for the measurement item to be measured first out of the requested measurement items.

<Step S3>

In step S3, the operation controller 82 initiates a measurement of the requested measurement item. At this time, if there is a request for plural measurements about the same measurement item, the operation controller 82 initiates the series of measurements. Then, control proceeds to step S4.

<Step S4>

In step S4, the operation controller 82 makes a decision as to whether or not the normal measurement operation is complete. At this time, if an input is made, for example, from the input section 60 to terminate the measurement operation performed by the automated analyzer 1 or if the automated analyzer 1 is powered off, the operation controller 82 determines that the measurement operation has ended (YES); otherwise, the controller 82 determines that the measurement operation has not ended (NO), and control returns to step S1. A decision is made as to whether or not there is a request for other measurement item, and subsequent steps are performed repeatedly.

<Step S101>

On the other hand, if the decision at step S2 is NO, indicating that the measurement is impossible to perform, and if control goes to step S101, the operation controller 82 instructs the display controller 81 to produce a warning output to the display device 50. In response, the display device 50 provides a warning of infeasibility of the measurement, for example, in the display of the measurement progress status 51c (see FIG. 3) of the confirmation screen 51. Where this automated analyzer 1 is equipped with a loudspeaker, a warning light, or the like as a warning output portion, the operation controller 82 causes such a warning output portion to issue a warning.

In consequence, the operator of the automated analyzer 1 can recognize that the requested measurement item is impossible to measure. Also, the operator confirms that the probe internal liquid of the analyte probe 21a is not appropriate owing to the display provided on the display device 50. Then, the operator can make an input to switch the operative liquid tank 31, for example, by manipulating the tank switching button or icon 52a (see FIG. 4) in the control screen 52 through the input section 60.

<Step S102>

In step S102, the operation controller 82 makes a decision as to whether there is an input to switch the operative liquid tank 31. If the tank switching button or icon 52a (see FIG. 4) in the control screen 52 is touched or manipulated, the operation controller 82 determines that there is an input to switch the operative liquid tank 31 (YES), and control goes to the next step S103. On the other hand, if the tank switching button or icon 52a in the control screen 52 is not manipulated and, at the same time, if an input is made to cancel the measurement of the requested measurement item, for example, the operation controller 82 goes to step S4. Consequently, the measurement of the requested measurement item is not carried out but skipped.

<Step S103>

In step S103, the operation controller 82 carries out the switching of the operative liquid tank 31. At this time, the operation controller 82 actuates the selector valve 33 of the internal liquid supply device 30 to switch the liquid tank 31 connected with the analyte probe 21a.

<Step S104>

In step S104, the operation controller 82 performs a priming process. At this time, the operation controller 82 controls the operation of the pump 23 mounted in the liquid supply tube 22 of the analyte probe 21a to replace the probe internal liquid present both in the liquid supply tube 22 and in the analyte probe 21a with the probe internal liquid L in the liquid tank 31 connected with the analyte probe 21a, so that the probe internal liquid L acts as a new probe internal liquid. Then, control goes to step S3. The operation controller 82 is made to initiate a measurement of the requested measurement item.

<<Advantageous Effects of First Example>>

According to the first example of the embodiment described so far, the selector valve 33 for switching the operative liquid tank 31 in communication with the analyte probe 21a is made to operate as an automatic valve. Thus, an input from the input section 60 can cause the operation controller 82 to actuate the selector valve 33. Therefore, when the operative liquid tank 31 is switched according to requested measurement item, it is not necessary for the operator to manually switch the connection of the liquid tanks 31, thus saving labor. As a result, when plural measurement items are measured using different kinds of probe internal liquid of the analyte probe 21a used for the measurements, if the connection of the operative liquid tank 31 were switched manually, human error might take place. Hence, erroneous connection of the operative tank 31 with the analyte probe 21a can be prevented. Wasteful measurements using a probe internal liquid inappropriate for the measurement item can be prevented from being carried out. Consequently, measurements using the automated analyzer 1 can be enhanced in efficiency.

<<Second Example of Method of Automated Analysis>>

Figure 8:
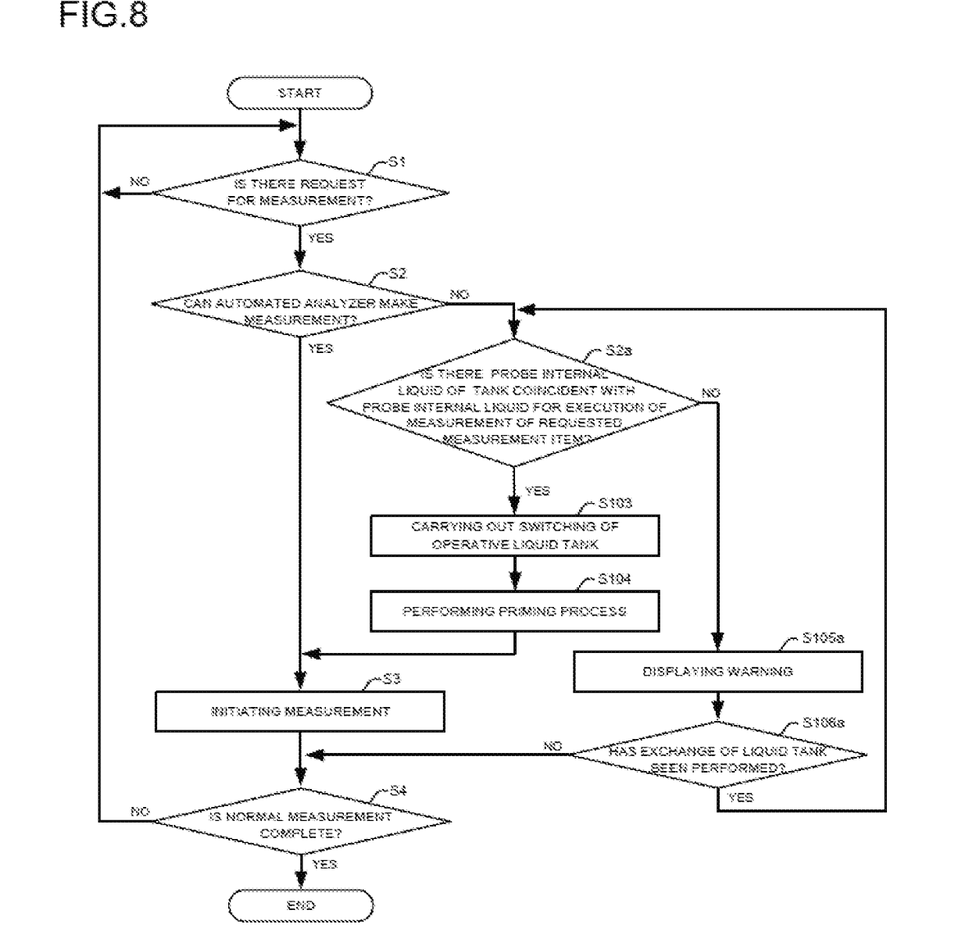
FIG. 8 is a flowchart illustrating a second example of the method of automated analysis using the automated analyzer of FIG. 1.

FIG. 8 is a flowchart illustrating a second example of the method of automated analysis using the automated analyzer 1 of the above embodiment. The illustrated method of automated analysis consists of a series of procedures of preprocessing for causing the automated analyzer 1 to initiate measurement processing regarding a requested measurement item when a normal measurement operation is effected. The procedures of this second example are similar to the procedures of the first example illustrated in FIG. 7 except that the decision as to whether the operative liquid tank 31 should be switched is made automatically.

These procedures are accomplished by executing programs stored in the data storage section using the CPU constituting the input/output controller 80 described in relation to FIG. 2. The second example of the method of automated analysis implemented by the input/output controller 80 of the automated analyzer 1 is described hereinafter with reference to the flowchart of FIG. 8, FIGS. 1 and 2, and also FIGS. 3-6 as necessary.

<Steps S1-S4>

Steps S1-S4 are performed in the same manner as in the first example. However, if the decision at step S2 is NO, indicating that the operation controller 82 has determined that measurement of the requested measurement item with the automated analyzer 1 is not feasible, control goes to step S2a.

<Step S2a>

In step S2a, the operation controller 82 makes a decision as to whether any one of the probe internal liquids L of the first tank 31a and the second tank 31b is coincident with the probe internal liquid of the analyte probe 21a for execution of measurement of the requested measurement item, based on the requested measurement item, on the setting information (see FIG. 5) regarding measurement items stored in the data storage section 70, and on the information (FIG. 6) about the liquid tank 31 connected with the analyte probe 21a.

If the decision is YES, indicating that there is a probe internal liquid coincident with that of the analyte probe 21a, control goes to step S103. On the other hand, if the decision is NO, indicating that there is not any probe internal liquid coincident with that of the analyte probe 21a, control proceeds to step S105a.

<Steps S103-S104>

Steps S103-S104 are performed in the same way as in the first example. Then, control goes to step S3.

<Step S105a>

On the other hand, in step S105a, the operation controller 82 instructs the display controller 81 to produce a warning output indicative of display to the display device 50. In response, the display device 50 provides a warning of infeasibility of measurement, for example, in the display of the measurement progress status 51c (see FIG. 3) of the confirmation screen 51. If the automated analyzer 1 is equipped with a loudspeaker, a warning light, or the like as a warning output portion, the operation controller 82 causes the warning output portion to issue a warning. Then, control goes to step S106a.

By executing this step S105a, the operator of the automated analyzer 1 can recognize that measurement of the requested measurement item is infeasible. Then, the operator confirms that a probe internal liquid permitting measurement of the requested measurement item is stored neither in the first tank 31a nor in the second tank 31b. The liquid tank 31 can be replaced with other tank compliant with the requested measurement item. The measurement item for which a decision has been made at step S2a may not be measured and kept intact.

<Step S106a>

In step S106a, the operation controller 82 makes a decision as to whether an exchange of the liquid tank 31 has been performed. If an input indicating that an exchange of the liquid tank 31 has been done is made from the input section 60, the operation controller 82 determines that the exchange has been done (YES), and control goes back to step S2a. The subsequent steps are repeated. On the other hand, if any input indicating that an exchange of the liquid tank 31 has been done is not made from the input section 60 and, at the same time, if an input for canceling measurement of the requested measurement item has been made, for example, the operation controller 82 goes to step S4. The subsequent steps are carried out. Consequently, measurement of the requested measurement item is skipped.

<<Advantageous Effects of Second Example>>

According to the second example of the embodiment described so far, when measurement of a requested measurement item is made feasible by switching the operative liquid tank 31 in communication with the analyte probe 21a, the state of the selector valve 33 is automatically switched by the operation controller 82. As a consequence, it is not necessary to manually switch the liquid tank 31 in communication with the analyte probe 21a, thus saving labor. Also, erroneous connection of the liquid tanks 31 with the analyte probe 21a can be prevented. Wasteful measurements using a probe internal liquid unsuitable for the measurement item can be prevented from being carried out. As a result, measurements using the automated analyzer 1 can be enhanced in efficiency.

In the description of the embodiment including the first and second examples described so far, the internal liquid supply device 30 is mounted to supply a probe internal liquid into the analyte dispensing probe 21a. Note that the present invention can be applied with similar utility, without being restricted to the use of the analyte dispensing probe 21a, to a configuration where a liquid aspirated into the dispensing probe 21 is dispensed into aliquot receptacles together with a probe internal liquid that is replaced according to details of processing.

The invention claimed is:

1. An automated analyzer comprising:
a liquid dispenser having a dispensing probe and a pump capable of aspirating and dispensing a liquid from and into an open end of the dispensing probe that is at one end thereof, the liquid dispenser being operative to cause the liquid aspirated in the dispensing probe from the open end and a probe internal liquid of the dispensing probe to be dispensed into aliquot receptacles;
an internal liquid supply device having a plurality of liquid tanks in which probe internal liquids corresponding to measurement items are stored, supply tubes for placing the liquid tanks in communication with the other end of the dispensing probe, and a selector valve mounted in front of the supply tubes and operative to selectively placing the plurality of liquid tanks into communication with the dispensing probe, the internal liquid supply device being operative to supply a probe internal liquid into the dispensing probe from one of the liquid tanks;
a data storage section configured to store information about the probe internal liquids in their respective liquid tanks and information about the probe internal liquid to be dispensed from the dispensing probe into the aliquot receptacles for each measurement item;
an input section for entering settings regarding operation of the liquid dispenser; and
an operation controller for controlling operation of the liquid dispenser based on inputs from the input section;
wherein the operation controller makes a decision as to whether or not the probe internal liquid in the liquid tank in communication with the dispensing probe is coincident with the probe internal liquid whose information is stored in the data storage section corresponding to the measurement item requested from the input section, and
if there is coincidence, the operation controller causes the automated analyzer to perform measurements of a plurality of measurement items by dispensing into the aliquot receptacles, the probe internal liquid whose information is stored in the data storage section corresponding to a measurement item requested from the input section;
if there is no coincidence, the operation controller is configured to again make a decision as to whether or not any probe internal liquid of the plurality of liquid tanks is coincident with the probe internal liquid whose information is stored in the data storage section corresponding to a measurement item requested from the input section, and, if there is a coincidence in any of the plurality of liquid tanks, the operation controller allows for switching the liquid tank in communication with the dispensing probe via the selector valve being an automatic valve under control of the operation controller to one of the liquid tanks whose probe internal liquid has the coincidence, and perform measurements of a plurality of measurement items by dispensing into the aliquot receptacles, the probe internal liquid whose information is stored in the data storage section corresponding to a measurement item requested from the input section; and if there is no coincidence in any of the plurality of liquid tanks, the operation controller causes measurement of the requested measurement item to be skipped without performing the measurement, and accepts a next request from the input section.

2. An automated analyzer as set forth in claim 1, further comprising a display device for displaying how said liquid tanks are in communication with said dispensing probe.

3. An automated analyzer as set forth in claim 2, further comprising:

a display controller for displaying, on said display device, the probe internal liquids in their respective liquid tanks whose information is stored in the data storage section.

4. An automated analyzer as set forth in claim 2, further comprising:

a display controller for causing said probe internal liquids which correspond to said measurement items, respectively, and whose information is stored in said data storage section to be displayed on said display device.

5. An automated analyzer as set forth in claim 1, further comprising:

a warning output portion for issuing a warning under control of said operation controller; and wherein if a request for measurement is input from said input section, said operation controller makes a decision as to whether or not the probe internal liquid in the liquid tank in communication with said dispensing probe is coincident with the probe internal liquid whose information is stored in the data storage section for the requested measurement item based on the information stored in the data storage section and, if there is no coincidence, the operation controller determines the measurement of the requested measurement item to be infeasible and causes the warning output portion to issue a warning.

6. An automated analyzer as set forth in claim 5, wherein, if the probe internal liquids of all of said plurality of liquid tanks are different from the probe internal liquid whose information is stored in said data storage section for said requested measurement item, said operation controller causes said warning output portion to issue a warning.

7. An automated analyzer as set forth in claim 1, wherein said operation controller actuates said selector valve to switch the liquid tank in communication with said dispensing probe and then operates said pump, thus supplying the probe internal liquid of the liquid tank in communication with the dispensing probe into the dispensing probe.

8. An automated analyzer as set forth in claim 1, wherein said liquid dispenser is an analyte dispenser for aspirating an analyte from the open end of said dispensing probe.

9. A method of automated analysis implemented by an automated analyzer having:

a liquid dispenser having a dispensing probe and a pump capable of aspirating and dispensing a liquid from and into an open end of the dispensing probe that is at one end thereof, the liquid dispenser being operative to cause the liquid aspirated in the dispensing probe from the open end and a probe internal liquid of the dispensing probe to be dispensed into aliquot receptacles;

an internal liquid supply device having a plurality of liquid tanks in which probe internal liquids are respectively stored for measurement items, supply tubes for placing the liquid tanks into communication with the other end of said dispensing probe, and a selector valve mounted in front of the supply tubes and operative to selectively place the liquid tanks into communication with the dispensing probe, the internal liquid supply device being operative to supply a probe internal liquid into the dispensing probe from one of the liquid tanks;

a data storage section configured to store information about the probe internal liquids in their respective liquid tanks and information about the probe internal liquid to be dispensed from the dispensing probe into the aliquot receptacles for each measurement item;

an input section for entering settings regarding operation of the liquid dispenser; and an operation controller for controlling operation of the liquid dispenser based on inputs from the input section;

the method comprising the steps of:

inputting a request for measurement item into the input section;

aspirating liquid into the dispensing probe;

deciding whether the probe internal liquid in the liquid tank in communication with the dispensing probe is coincident with the probe internal liquid whose information is stored in the data storage section corresponding to the measurement request;

if there is coincidence, supplying the dispensing probe with the probe internal liquid;

dispensing the aspirated liquid and the probe internal liquid into an aliquot receptacle;

and measuring the requested measurement item;

or if there is no coincidence, causing a warning to issue from an output portion of the automated analyzer, determining if there is another probe internal liquids available to the internal liquid supply device to switch into communication with the dispensing probe, if there is another probe internal liquid available in another liquid tank, actuating the selector valve under control of the operation controller to switch the other liquid tank into communication with the dispensing probe;

supplying the dispensing probe with the other probe internal liquid from the other liquid tank; and dispensing the aspirated liquid and the other probe internal liquid into an aliquot receptacle; and measuring the requested measurement item;

if there is no other probe internal liquid available in another liquid tank, skipping measurement of the requested measurement item and accepting a next request from the input section.

10. A method of automated analysis as set forth in claim 9 wherein if the probe internal liquids of all the liquid tanks are different from the probe internal liquid whose information is stored in said data storage section for said requested measurement item, said warning output portion issues a warning.

11. A method of automated analysis as set forth in claim 9 wherein if the probe internal liquid in the liquid tank in communication with said dispensing probe is not coincident with the probe internal liquid whose information is stored in said data storage section for the requested measurement item and, at the same time, if the probe internal liquid of any one of the liquid tanks is coincident with the probe internal liquid whose information is stored in the data storage section for the requested measurement item, the selector valve is actuated to bring the probe internal liquid of the liquid tank in communication with the dispensing probe into coincidence with the probe internal liquid whose information is stored in the data storage section for the requested measurement item.

12. A method of automated analysis as set forth in claim 9, wherein the probe internal liquid of the liquid tank in communication with said dispensing probe is supplied into the dispensing probe by operating said pump after switching the communication of the plurality of liquid tanks with the dispensing probe by actuation of said selector valve.

13. An automated analyzer comprising:
a liquid dispenser having a dispensing probe and a pump capable of aspirating and dispensing a liquid from and into an open end of the dispensing probe that is at one end thereof, the liquid dispenser being operative to cause the liquid aspirated in the dispensing probe from the open end and a probe internal liquid of the dispensing probe to be dispensed into aliquot receptacles;
an internal liquid supply device having a plurality of liquid tanks in which probe internal liquids corresponding to measurement items are stored, supply tubes for placing the liquid tanks in communication with the other end of the dispensing probe, and a selector valve mounted in front of the supply tubes and operative to selectively placing the plurality of liquid tanks into communication with the dispensing probe, the internal liquid supply device being operative to supply a probe internal liquid into the dispensing probe from one of the liquid tanks;
a data storage section configured to store information about the probe internal liquids in their respective liquid tanks and information about the probe internal liquid to be dispensed from the dispensing probe into the aliquot receptacles for each measurement item;
an input section for entering settings regarding operation of the liquid dispenser; and
an operation controller for controlling operation of the liquid dispenser based on inputs from the input section;
wherein the operation controller makes a decision as to whether or not the probe internal liquid in the liquid tank in communication with the dispensing probe is coincident with the probe internal liquid whose information is stored in the data storage section corresponding to the measurement item requested from the input section, and
if there is coincidence, the operation controller causes the automated analyzer to perform measurements of a plurality of measurement items by dispensing into the aliquot receptacles, the probe internal liquid whose information is stored in the data storage section corresponding to a measurement item requested from the input section;
if there is no coincidence, the operation controller causes a warning to issue from an output portion of the automated analyzer; allowing for switching of liquid tanks in communication with the dispensing probe via the selector valve being an automatic valve under control of the operation controller, and
the operation controller again makes a decision as to whether or not an exchange of liquid tank has been made, and
if the exchange has been made, the operation controller causes the automated analyzer to perform measurements,
if no exchange has been made, the operation controller causes measurement of the requested measurement item to be skipped without performing the measurement, and accepts a next request from the input section.

* * * * *

UNITED STATES PATENT AND TRADEMARK OFFICE
CERTIFICATE OF CORRECTION

PATENT NO. : 11,175,302 B2
APPLICATION NO. : 16/390244
DATED : November 16, 2021
INVENTOR(S) : Makoto Asakura et al.

It is certified that error appears in the above-identified patent and that said Letters Patent is hereby corrected as shown below:

On the Title Page

Column 2, item (57), Abstract, Line 10, delete "includes;" and insert -- includes --

In the Claims

Column 16, Line 66, Claim 10, delete "9" and insert -- 9, --

Column 17, Line 5, Claim 11, delete "9" and insert -- 9, --

Signed and Sealed this
Third Day of May, 2022

Katherine Kelly Vidal
*Director of the United States Patent and Trademark Office*